United States Patent [19]

Perna et al.

[11] 4,020,290
[45] Apr. 26, 1977

[54] SIGNALIZATION COORDINATOR FOR PCM SWITCHING SYSTEM

[75] Inventors: Aldo Perna, Varese; Manlio Springolo, Milan, both of Italy

[73] Assignee: Societa Italiana Telecomunicazioni Siemens S.p.A., Milan, Italy

[22] Filed: Dec. 18, 1975

[21] Appl. No.: 642,196

[30] Foreign Application Priority Data

Dec. 19, 1974 Italy .................................. 30745/74

[52] U.S. Cl. .......................................... 179/15 AT
[51] Int. Cl.² .......................................... H04J 3/00
[58] Field of Search ....... 179/15 AT, 15 AQ, 15 A, 179/18 J, 18 ES, 18 E, 18 EB, 15 AP

[56] References Cited

UNITED STATES PATENTS

| 3,768,079 | 10/1973 | Bittermann et al. | 179/18 ES |
| 3,885,103 | 5/1975 | Smith et al. | 179/15 AT |
| 3,908,092 | 9/1975 | Hight et al. | 179/15 AT |

*Primary Examiner*—Thomas A. Robinson

*Attorney, Agent, or Firm*—Karl F. Ross; Herbert Dubno

[57] ABSTRACT

An intermediate switching station or exchange, designed to establish temporary connections between calling and called lines of a telephone or other telecommunication system, is connected via $n$ multichannel links to as many trunk terminals, the $m$ channels of each link being represented by or converted into respective time slots of a PCM message frame of $(m+2)$ time slots which also include a special time slot for switching codes. The code words from the special time slots of all incoming links are interleaved in a PCM switching frame of $(m+2)$ time slots, with $(n+1)$ such frames constituting a recurrent superframe carrying switching codes from all lines served by the exchange. A signalization coordinator converts the switching codes extracted from the superframe into signals for the actuation of a switching-control unit and reconverts response signals from that unit into switching codes to be inserted into outgoing message frames.

10 Claims, 6 Drawing Figures

FIG. 5
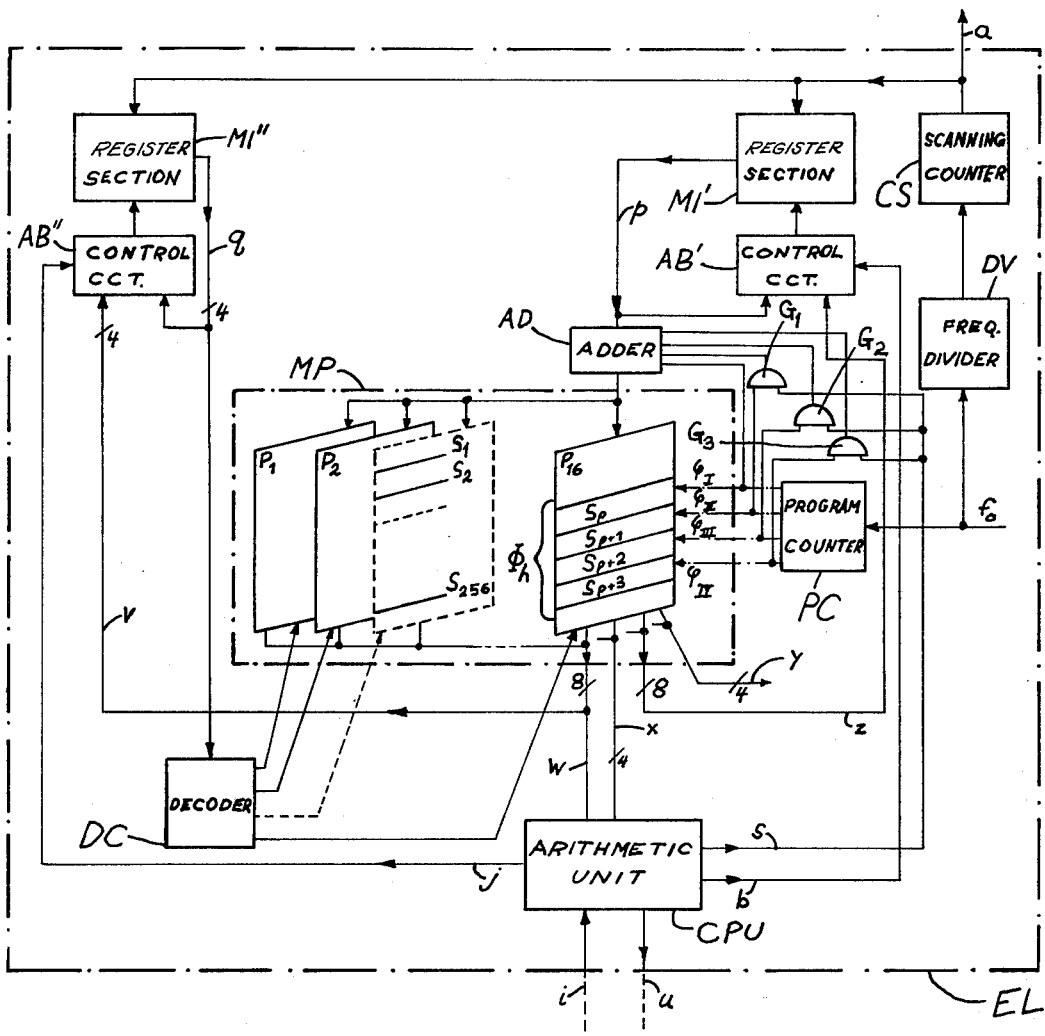
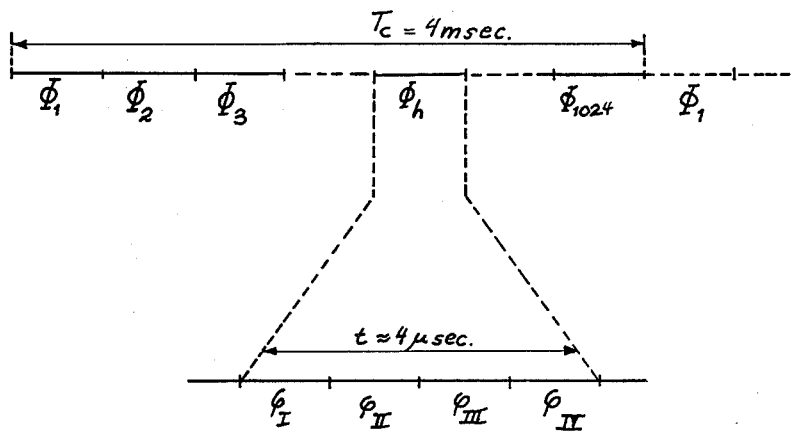
FIG. 6

SIGNALIZATION COORDINATOR FOR PCM SWITCHING SYSTEM

FIELD OF THE INVENTION

Our present invention relates to a signalization coordinator for a telephone or other telecommunication system, that system including an intermediate switching station or exchange for the temporary establishment of connections between calling and called lines via different multichannel links or trunks extending between that exchange and respective central offices referred to hereinafter as trunk terminals.

BACKGROUND OF THE INVENTION

In commonly owned U.S. Pat. No. 3,713,106, issued 23 Jan. 1973 in the name of Giorgio Dal Monte, there has been described an intermediate switching station or exchange of this general type serving incoming and outgoing channels of a pulse-code-modulation (PCM) communication system. The term "channel", as defined in that prior patent, denotes a succession of periodically recurrent time slots interleaved with similar time slots of other channels in a predetermined sequence to form a PCM message frame. In practice, as also stated in the patent, such a frame may be composed of 32 time slots each containing eight bits for a total of 256 bits per frame, the frames following one another at a repetition rate or cadence of 8000 Hz corresponding to 2.048 Mbits per second.

With $n$ links converging at the exchange, each link carrying $m$ channels, a total of $m.n$ lines have to be scanned periodically for switching signals such as area or central-office codes sent out by calling subscribers to establish connections with other subscribers reachable through the exchange. Such signals are conveniently transmitted in a special time slot reserved therefor in the PCM message frame, e.g. the 16th time slot in a 32-slot frame as described in the Dal Monte patent. Since another time slot of each frame (No. 0) is allocated to a frame-synchronizing signal, there is room in such a frame for 30 channels ($m = 30$).

Thus, in a sequence of $m$ frames it is possible to transmit switching codes for all the lines served by a given trunk terminal. In practice, a cycle of 32 rather than 30 frames will generally be used for the sequential transmission of switching information from the associated group of 30 local lines. During the same cycle, similar switching information is sent to the exchange via all the other links for their respective line groups. We may refer to such local lines as subscribers even though they may be only temporarily connected to specific subscriber stations.

With the number $n$ of links equal to 31, for example, the total number of 930 switching codes can be processed within a switching cycle of 1024 times slots if the processing time for each code is on the order of a time slot, i.e. about 4 $\mu$sec in the specific instance here discussed. Such processing, as is known, involves the repetitive evaluation of switching codes from the same channel, for the purpose of verifying their authenticity with exclusion of spurious signals or transients. A switching operation should therefore be carried out only if the same signal persists on a line for a predetermined period (which may be different for different types of switching operations), i.e. if it recurs in the same time slot during a number of consecutive cycles.

OBJECTS OF THE INVENTION

An object of our present invention, therefore, is to provide means in such a switching station for evaluating the switching codes of $n$ links, carrying $m$ PCM channels each, in a period on the order of $m.n$ time slots to establish (or release) the temporary connections between calling and called subscribers.

A complicating factor in such an exchange may be the diversity of the various links which could include, besides or in lieu of PCM channels, radio links operating by frequency division (FDM) and/or metallic circuits with spatially separated low-frequency transmission lines. A more particular object of our invention, therefore, is to provide a signalization coordinator for an intermediate exchange serving a variety of such multichannel links.

SUMMARY OF THE INVENTION

We realize these objects, in accordance with our present invention, by the provision of a signalization coordinator having a first interface unit connected to the several links for receiving therefrom, in a switching cycle, incoming code words from all the channels in a predetermined sequence whereby each channel is unequivocally identified by the time position of its code words in that cycle; a processor controlled by a clock circuit and connected to this first interface unit for periodically evaluating, in respective time slots of a switching cycle, the incoming code words and generating corresponding binary commands for the switching circuitry of the exchange; and a second interface unit inserted between the processor and the switching circuitry for transmitting the commands to that circuitry and receiving binary response signals therefrom, the latter signals being converted by the processor into outgoing code words. A circulating memory of a type well known per se, e.g. as described in commonly owned U.S. Pat. No. 3,581,016 issued 25 May 1971 in the names of Saverio Martinelli et al, receives the outgoing code words and stores them for periodic presentation to the respective channels during corresponding time slots of successive switching cycles.

Advantageously, pursuant to another feature of our invention, the two interface units include respective logic networks and associated memories. The first logic network extracts the incoming code words from a superframe which is synthesized from the code words appearing in incoming PCM message frames during a switching cycle, the first memory storing these code words in stages respectively assigned to these channels; the first logic network is further connected to the circulating memory for interleaving its outgoing code words in a superframe preparatorily for distribution into outgoing PCM message frames. The second logic network classifies the received response signals according to accompanying address information for storage in stages of the second memory which are respectively assigned to these channels.

Pursuant to a further feature of our invention, the processor comprises a program store containing a multiplicity of multibit instructions whose addresses are temporarily stored in an associated register controlled by the clock circuit. A computer, with data inputs and data outputs connected to both interface units, has input connections extending to the program store and output connections extending to the associated address register for receiving operating portions of the stored instructions which control the processing of information of either interface unit. The computer also determines from these instructions the further addressing of the program store by its associated register. The generation of commands by the computer in response to instructions read out from the program store is controlled by timing circuitry measuring the persistence of incoming code words which give rise to these instructions.

BRIEF DESCRIPTION OF THE DRAWING

The above and other features of our invention will now be described in detail with reference to the accompanying drawing in which:

FIG. 5 shows additional details of the processor of FIG. 4; and

FIG. 6 is a time diagram relating to the operation of the processor.

SPECIFIC DESCRIPTION

Figure 1:
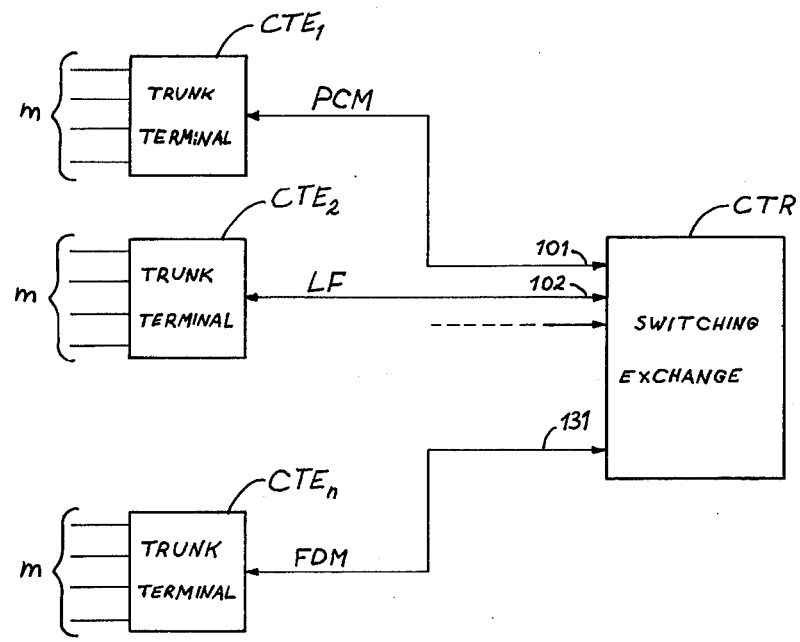
FIG. 1 is a block diagram of a telephone system embodying our invention.

In FIG. 1 we have shown part of a telephone network comprising $n$ trunk terminals $CTE_1$, $CTE_2$, ... $CTE_n$ each serving a group of $m$ subscribers. These trunk terminals can communicate with one another via a common switching exchange CTR to which they are connected over respective two-way links 101, 102, ... 131, referred to hereinafter as trunks, with $n = 31$. Each trunk 101 etc. is of the multichannel type, the number of channels being $m = 30$ in each instance. As indicated by way of example, trunk 101 is of the PCM type discussed above, trunk 102 consists of $m$ parallel low-frequency circuits LF and trunk 131 is a radio link operating by frequency division (FDM). The several trunk terminals also include signal generators, not further illustrated, for transmitting switching criteria to the exchange CTR over their respective links. These switching criteria are generated, in the conventional manner, by subscriber-initiated signals such as dial pulses as well as by the outputs of line-voltage sensors monitoring the activity of a given subscriber.

Figure 2:
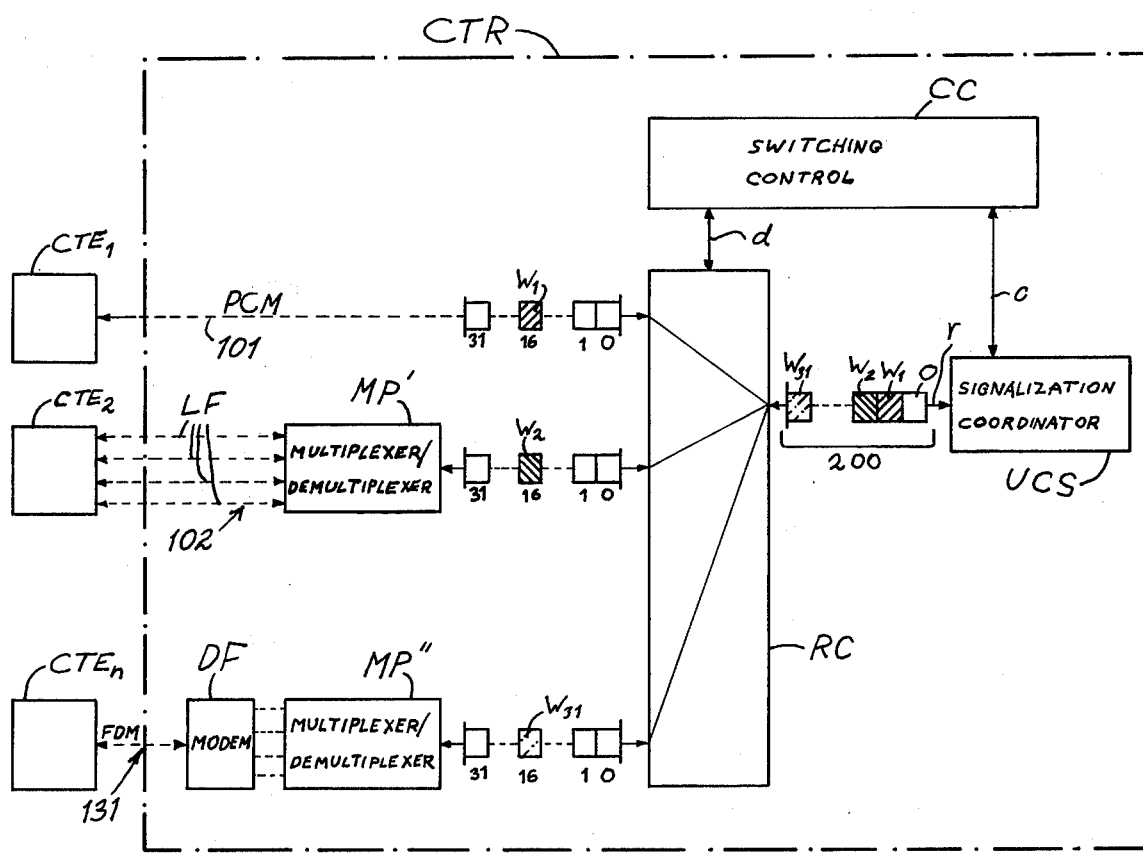
FIG. 2 is a more detailed diagram of the system of FIG. 1, showing individual components of a switching exchange included in that system.

In the case of PCM links, such as the trunk 101, the switching criteria are translated at the trunk terminal into 8-bit code words transmitted in the 16th time slot of a 32-slot message frame, as illustrated at $W_1$ in FIG. 2. As further shown in FIG. 2, voice frequencies transmitted over the 30 circuits LF of trunk 102 between terminal $CTE_2$ and exchange CTR are converted in that exchange into a similar 32-slot frame by means of a multiplexer MP', again with insertion of the accompanying switching signals in the No. 16 time position thereof as a code word $W_2$. In the case of FDM link 131 extending from terminal $CTE_n$, the 30 carrier frequencies are demodulated in a modem DF which feeds their respective voice frequencies and accompanying switching signals to a multiplexer MP'' for conversion into another such frame of 32 time slots, that frame likewise including in its No. 16 time position a code word $W_{31}$ derived from these switching signals. For transmission in the opposite direction, circuits MP' and MP'' operate as demultiplexers even as modem DF modulates the outgoing low-frequency signals onto respective carriers.

Trunks 101, 102, ... 131 terminate within the exchange CTR at a switching matrix RC under the control of a unit CC. Matrix RC, which may operate in the general manner described in the above-identified Dal Monte patent, extracts from each incoming frame the code words $W_1$, $W_2$, ... $W_{31}$ and combines these code words into a 32-slot switching frame 200 delivered to a signalization coordinator UCS, more fully described hereinafter, over an incoming branch of a two-way line $r$; the coordinator also supplies such switching frames over an outgoing branch of line $r$ to the matrix RC for distribution of their code words into the No. 16 time slots of outgoing message frames according to the time positions of these code words within the switching frame. A two-way connection $c$ extends from coordinator UCS to control unit CC which in turn transmits switching commands to matrix RC via a connection $d$ and receives response signals (confirmation, line free, busy etc.) over the same path.

The first time slot ("0") of the switching frame 200 contains, instead of a switching code, a frame-synchronizing code which counts the number of such frames following one another in a 32-frame superframe consisting of 1024 time slots $\Phi_1 - \Phi_{1024}$ as illustrated in FIG. 6, the duration $T_c$ of this superframe equaling 4 msec and corresponding to the aforementioned switching cycle; reference in this connection may also be made to commonly owned U.S. Pat. No. 3,749,842 issued 31 July 1973 in the name of Isidoro Poretti. Only 930 of these 1024 time slots are needed to carry switching information from the 31 trunks serving 30 subscribers each; the remaining time slots of the superframe are unused, except for the aforementioned frame-sync codes in the No. 0 time slots and a multiframe-synchronizing code in, for example, the No. 16 time slot of frame No. 0. With the aid of these sync signals the time position of each switching code in a multiframe is uniquely determined, together with the identity of the subscriber line from which it originates or for which it is destined.

Figure 3:
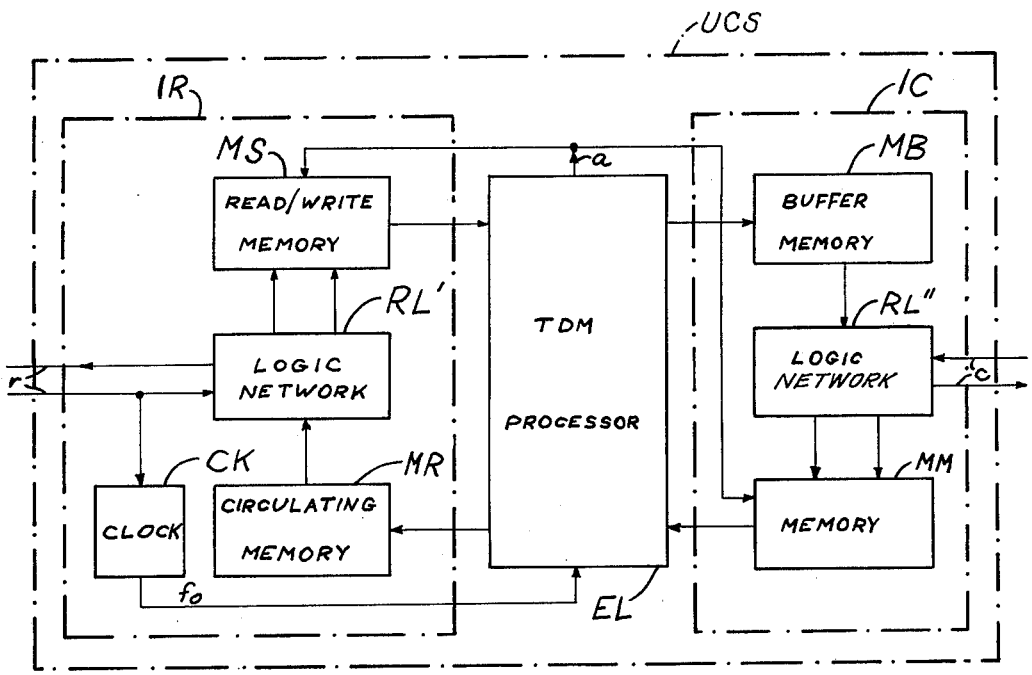
FIG. 3 is a block diagram of a signalization coordinator forming part of the switching exchange of FIG. 2.

In FIG. 3 we have shown the coordinator UCS as comprising a first interface unit IR exchanging information with switching matrix RC via line $r$, a second interface unit IC communicating with control unit CC via line $c$, and a time-division-multiplex (TDM) processor EL co-operating with these two interface units. The first unit IR includes a clock circuit CK which extracts synchronizing signals from the incoming branch of line $r$ and generates a train of timing pulses of frequency $f_o$ equaling half the bit cadence, i.e. 1024 kHz or approximately 1 MHz. A logic network RL' in this unit is directly connected across line $r$ and works into a read/write memory MS for the storage of incoming switching codes $W_1$ etc. in respective stages individually assigned to the time positions of these codes in the superframe composed of the 32 switching frames 200 arriving within a cycle $T_c$ of 4 msec. This unit further includes a circulating memory MR working into logic network RL for feeding the codes of response signals back to the calling subscribers via the outgoing branch of line $r$.

Interface unit IC comprises a buffer memory MB for the storage of switching commands, destined for control unit CC, which are fed to another logic network RL'' directly connected across line $c$. Binary response signals from control unit CC, accompanied by addresses of the lines for which they are intended, are stored by the network RL'' in respective stages of a memory MM as determined by these addresses. Memories MS and MM are periodically sampled, under the control of progressively changing address codes on an output line $a$ of a scanning counter CS (FIG. 5), at one-fourth the frequency $f_o$ whereby their 1024 stages (of which only 930 are utilized) are scanned in the course of each 4-msec cycle $T_c$. The contents of the stages being sampled, however, are read only in the presence of specific selection signals emitted by a program memory MP (FIGS. 4 and 5) within the TDM processor EL as more fully described hereinafter.

Figure 4:
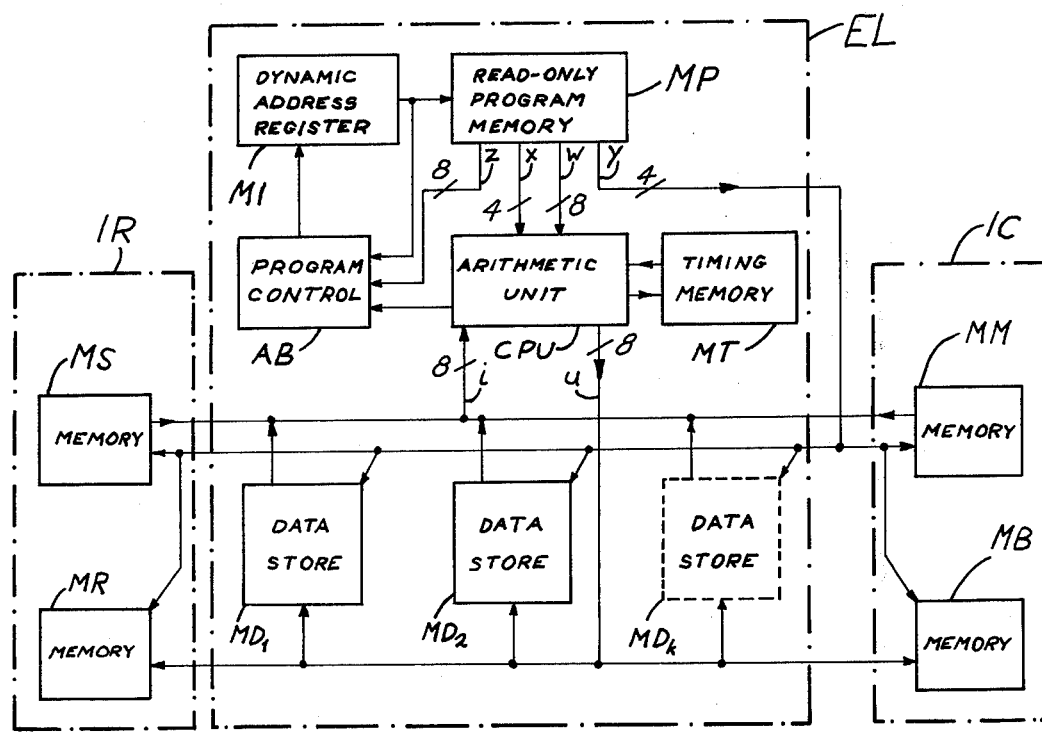
FIG. 4 is a more detailed diagram of a processor included in the signalization coordinator of FIG. 3.

FIG. 4 shows the program memory MP, which is of the read-only type, as provided with four outputs $x$, $y$, $z$ and $w$; each of these outputs is a multiple as indicated schematically by a slanting transverse stroke, the number adjacent the stroke representing the number of leads in the multiple. Multiples $x$ and $w$, of 4 and 8 leads respectively, extend to an arithmetic unit or computer CPU whose logical circuitry receives data via an 8-lead input multiple $i$ and emits data via an 8-lead output multiple $u$. The latter multiple extends to memories MR and MB as well as to several ancillary dynamic memories $MD_1$, $MD_2$, ... $MD_k$ for the temporary storage of intermediate data computed in unit CPU. Input multiple $i$ originates at these ancillary data stores and also at memories MS and MM. The output multiple $y$ of program memory MP, also having four leads, extends to memories MS, MR, $MD_1 - MD_k$, MM and MB in parallel. Output multiple $z$, with eight leads, terminates at a program-control unit AB co-operating with a dynamic address register MI of 4096 stages containing the addresses of as many 24-bit instructions stored in program memory MP. A timing memory MT includes 4096 counters connected to unit CPU for the purpose of determining the persistence of any of these instructions in that unit, in response to corresponding switching codes fed in from memory MS, and of authorizing the generation of binary switching commands for control unit CC if the presence of these switching codes on their respective incoming channel branches exceeds a predetermined time limit which may vary from one instruction to the other. Memory MR monitors the progress of every call on all the channels, in the general manner described in the aforementioned Martinelli et al patent.

The operation of the system so far described is as follows

The 24 bits of an instruction read out from program memory MP, in response to a particular address appearing in the output of register MI, are divided into four parts, namely a 4-bit operational code on output $x$, a 4-bit operand code on output $y$, an 8-bit jump-instruction code on output z, and an 8-bit masking code on output $w$. The first code determines the type of operation to be performed in unit CPU on an operand extracted under the control of the second code from one of the memories MS, MM, $MD_1 - MD_k$. The third code constitutes the address of the next instruction in memory MP which is to be read out from register MI as soon as unit CPU sends a jump signal to unit AB; in the absence of such a jump signal, the address appearing in the output of register MI is recirculated to that register for another readout in the next switching cycle, i.e. 4 msec later. The bit pattern of the fourth code controls the conversion of a response signal from unit CC, read out from memory MB, into a code word similar to words $W_1 - W_{31}$ to be sent back to the calling subscriber by way of line $r$ with interim storage in circulating memory MR so as to be periodically presented to logic network RL' in the proper time position of successive cycles $T_c$.

As illustrated in FIG. 5, register MI is split into two sections MI' and MI'' coacting with respective sections AB' and AB'' of program-control unit AB. Program memory MP comprises sixteen modules $P_1 - P_{16}$, referred to hereinafter as pages, each page being divided into 256 stages $S_1$, $S_2$, ... $S_{256}$. Register section MI' contains the addresses of the 256 stages, its output $p$ being an 8-lead multiple connected in parallel to all the pages $P_1 - P_{16}$ to preselect corresponding stages thereof. Such selection, however, becomes effective only for the page addressed by a 4-lead output multiple $q$ of register section MI'' which terminates at a decoder DC with individual output leads to the several pages.

The several output multiples $x$, $y$, $z$ and $w$ of memory MP are all connected in parallel to all the pages $P_1 - P_{16}$ thereof, as particularly illustrated for multiple $w$. This multiple has a branch $v$ of four leads (not shown in FIG. 4) extending to control circuit AB''. Whenever the nature of the program requires a jump from one memory page to another, multiple $v$ carries the address code of the next page; otherwise, the address appearing on multiple $q$ is recirculated to register section MI'' via control circuit AB''. Such an address change is authorized by a jump signal on an output lead $j$ of arithmetic unit CPU. A similar jump signal on an output lead $b$ of that unit makes the control circuit AB' receptive to the jump-instruction address on multiple $z$ which is thus entered in the proper stage of register section MI' and which can be recirculated via multiple $p$ until the next jump signal appears on lead $b$.

Let us assume, by way of example, that an instruction read out from memory MP during a given time slot $\Phi_h$ calls for the sending of a binary response signal from control unit CC back to the calling subscriber. The operand code on output multiple $y$ then addresses the memory MM to read out the contents of its stage assigned to the channel which is being processed during this particular time slot, the operational code on output multiple $x$ instructing the unit CPU to verify whether that stage of memory MM contains such a response signal. If the verification is negative, unit CPU does not emit a jump signal on output $b$ so that the contents of the corresponding stage of address-register section MI' remain unchanged for the next cycle; otherwise, i.e. if the presence of such a response signal is verified, that register stage is loaded with the new instruction to be read out in the following cycle. Whenever a given subscriber line becomes inactive, computer CPU responds to the corresponding signal code by loading the register MI (via unit AB) with the address of an initial program instruction.

A program counter PC has four outputs $\phi_I$, $\phi_{II}$, $\phi_{III}$ and $\phi_{IV}$ extending to an adder AD inserted into the output multiple $p$ of register section MI' for the purpose of modifying the numerical value of the stage-preselection code during successive fractional intervals or phases, similarly labeled in FIG. 6, into which each time slot $\phi$ is subdivided. Thus, as schematically illustrated in FIG. 5 for certain stages of memory page $P_{16}$, a stage $S_p$ preselected during the first phase $\phi_I$ of a time slot $\phi_h$ corresponds to the address read out from register section MI'; in the second phase $\phi_{II}$ the counter may increase this numerical value by one so that stage $S_{p+1}$ is preselected. Similarly, the next-following stages $S_{p+2}$ and $S_{p+3}$ can be preselected during phases $\phi_{III}$ and $\phi_{IV}$, respectively. Such a modification of the address code, however, occurs only in the presence of an enabling pulse on an output lead $s$ of arithmetic unit CPU extending to three AND gates $G_1$, $G_2$ and $G_3$ in counter outputs $\phi_{II}$, $\phi_{III}$ and $\phi_{IV}$, respectively. Without such a pulse the counter output is blocked after the first or a subsequent phase; the adder AD then cuts off the preselection code on multiple $p$.

Since the counter CP is reset after every fourth timing pulse, its output $\phi_I$ is again energized at the beginning of the next time slot $\phi_{h+1}$ so that at least one instruction can be preselected. The generation of an enabling pulse on lead $s$ is determined by computer CPU from a discriminating bit of the operational code forming part of the instruction just read out from memory MP.

A frequency divider DV, with a step-down ratio of 1:4, receives the timing pulses from clock circuit CK and controls the scanning counter CS at a cadence of about 4 $\mu$sec, compared with a stepping rate of about 1 $\mu$sec for counter CP.

Thus, the program counter CP enables a main instruction along with one or more ancillary instructions to be carried out in certain time slots in which such multiple instructions are called for by the program associated with a particular channel.

The evaluation of the switching and response signals originating at or destined for the various channels served by the exchange CTR in processor EL, as described hereinabove, takes place in an interleaved fashion and thus practically simultaneously.

We claim:

1. In a telecommunication system wherein an exchange, serving $n$ multichannel links of $m$ channels each, includes switching circuitry for establishing temporary connections between calling lines and called lines, accessible through incoming and outgoing channels of different links, and control means for operating said switching circuitry in response to incoming switching signals in the form of code words occupying predetermined time positions in PCM message frames forming part of incoming channel branches, operation of said switching circuitry giving rise to response signals to be transmitted in the form of code words occupying predetermined time positions in PCM message frames forming part of outgoing channel branches, the combination therewith of a signalization coordinator in said exchange comprising:

clock means for establishing a recurrent switching cycle divided into a multiplicity of time slots;

first interface means connected to said links for receiving therefrom, in said switching cycle, incoming code words from all said channels in a predetermined sequence whereby each channel is unequivocally identified by the time position of its code words in said switching cycle;

processor means controlled by said clock means and connected to said first interface means for periodically evaluating, in respective time slots of a switching cycle, the incoming code words and generating corresponding binary commands for said switching circuitry;

second interface means inserted between said processor means and said switching circuitry for transmitting said commands to said switching circuitry and receiving binary response signals therefrom, said processor means being connected to said second interface means for conversion of said response signals into outgoing code words; and circulating memory means connected to said processor means for periodically presenting said outgoing code words to said first interface means for retransmission to the respective channels during corresponding time slots of successive switching cycles.

2. The combination defined in claim 1 wherein said first interface means includes a first logic network for extracting said incoming code words from a superframe synthesized from the code words appearing in incoming PCM message frames during said switching cycle, and first memory means connected to said first logic network for storing said incoming code words in stages respectively assigned to said channels, said first logic network being connected to said circulating memory means for interleaving said outgoing code words in a superframe preparatorily to distribution into outgoing PCM message frames; said second interface means including a second logic network for classifying said response signals according to accompanying address information, and second memory means connected to said second logic network for storing the response signals so classified in stages respectively assigned to said channels.

3. The combination defined in claim 2, further comprising a buffer memory inserted between said processor means and said second logic network for temporary storage of said commands.

4. The combination defined in claim 1 wherein said processor means comprises program-storing means containing a multiplicity of multibit instructions, register means controlled by said clock means for storing addresses of instructions called for by said incoming code words, and computer means with data inputs and data outputs connected to said first and second interface means, said computer means having input connections extending to said program-storing means and output connections extending to said register means for receiving operating portions of said instructions for the processing of information from either of said interface means and for determining from said instructions the further addressing of said program-storing means by said register means.

5. The combination defined in claim 4 wherein said processor means further comprises ancillary dynamic memory means connected to said data inputs and data outputs for the temporary storage and readout of intermediate computation results.

6. The combination defined in claim 4, further comprising timing circuitry connected to said computer means for measuring the persistence of incoming code words giving rise to instructions read out from said program-storing means, said computer means generating said commands in response to instructions present for a predetermined minimum length of time.

7. The combination defined in claim 4, further comprising counting means controlled by said clock means for measuring fractional intervals of each time slot, said program-storing means being connected to said counting means for modifying an instruction address from said register means during successive fractional intervals whereby a plurality of instructions can be read out during a given time slot.

8. The combination defined in claim 7 wherein said computer means has an output connection for selectively blocking and unblocking said counting means in response to an instruction previously read out.

9. The combination defined in claim 4 wherein said register means is provided with control circuitry for recirculating an instruction address in a given stage for repetitive readout in successive switching cycles in response to a first type of signal from said computer means and for feeding a new instruction into said register means in response to a second type of signal from said computer means.

10. The combination defined in claim 9 wherein said program-storing means comprises a multiplicity of memory pages each with a multiplicity of stages, said register means and said control means being divided into first sections for preselecting corresponding stages in all said memory pages and second sections for selecting a single memory page to read out the contents of the preselected stage thereof.

* * * * *